United States Patent [19]

Simoes et al.

[11] Patent Number: 5,372,553

[45] Date of Patent: Dec. 13, 1994

[54] PRORAKE

[76] Inventors: Fausto Simoes; Silvio Simoes, both of 13 Maheu Street, Châteauguay, Canada, J6K 3E7

[21] Appl. No.: 52,930

[22] Filed: Apr. 27, 1993

[51] Int. Cl.[5] ............................................. F16H 57/00
[52] U.S. Cl. ................................... 474/92; 15/236.09
[58] Field of Search ................ 474/92, 152, 153, 161, 474/273; 15/236.07–236.09

[56] References Cited

U.S. PATENT DOCUMENTS

| 648,724 | 5/1900 | Cole | 474/92 |
|---|---|---|---|
| 2,242,608 | 5/1941 | Graves | 15/236.07 X |
| 3,106,740 | 10/1963 | Dukes | 15/236.08 X |
| 4,858,266 | 8/1989 | Engstrom | 15/111 |
| 4,960,402 | 10/1990 | Kleine t al. | 474/101 X |
| 5,207,619 | 5/1993 | Klein et al. | 474/101 |

FOREIGN PATENT DOCUMENTS

| 13703 | of 1895 | United Kingdom . |
|---|---|---|
| 11285 | of 1896 | United Kingdom . |
| 8736 | of 1899 | United Kingdom . |
| 7445 | of 1900 | United Kingdom . |

Primary Examiner—Roger J. Schoeppel

[57] ABSTRACT

A cleaning device for cleaning foreign matter which is lodged between the sprockets of a bicycle wheel drive shaft, and particularly, but not exclusively, useful for the sprocket clusters of mountain-type bicycles. The device includes a scraper element which extends in the space or spaces defined between the sprockets for dislodging foreign matter lodged in this space. An attachment bracket retains the scraper element at a predetermined position.

8 Claims, 1 Drawing Sheet

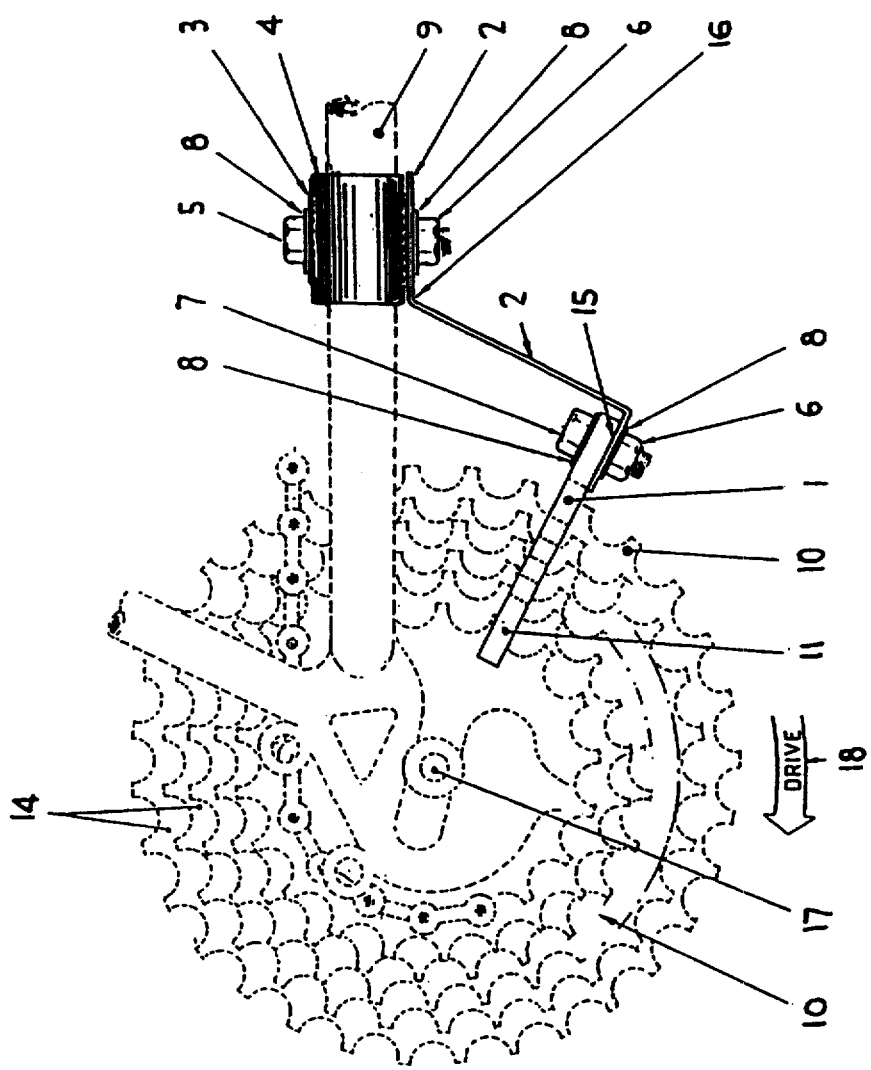
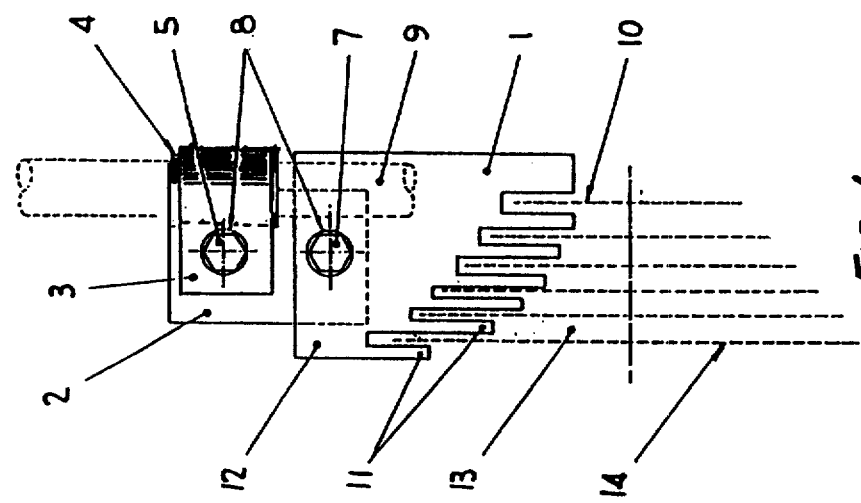
FIG. 2
FIG. 1

PRORAKE

BACKGROUND OF THE INVENTION

This invention relates to a cleaning device for cleaning foreign matter from between the drive sprockets secured to a bicycle wheel drive shaft and particularly, but not exclusively, between a cluster sprocket arrangement as found on mountain-type bicycles.

Mountain-type bicycles, of the type usually utilized on off-road surfaces, are often operated on terrain which gives rise to sprocket damage for the reason that grass, mud, snow or other various types of foreign matter will become trapped between the sprockets. This will cause the drive chain to skip and dislodge itself and make the pedalling of the bicycle more difficult. Such foreign articles can also cause damage to the sprockets and the chain. In order to deal with this problem it is necessary to stop the bicycle and manually clean the space between the sprockets.

SUMMARY OF THE INVENTION

It is an object of the present invention to provide a cleaning device for cleaning foreign matter from between spaced apart sprockets which are secured to a bicycle wheel drive shaft, and which substantially overcomes the above mentioned disadvantage of the prior art.

According to the above object, the present invention provides a cleaning device for cleaning foreign matter from between at least two spaced apart sprockets se, cured to a bicycle wheel drive shaft. The device comprises a scraper element extending in a space defined between at least two sprockets for dislodging foreign matter lodged in that space. Attachment means is provided to retain the scraper element at a predetermined position.

BRIEF DESCRIPTION OF THE DRAWINGS

A preferred embodiment of the present invention will now be described with reference to the accompanying drawings in which:

FIG. 1 is a top plan view of the cleaning device of the present invention, and

FIG. 2 is a side view of the cleaning device of the present invention showing its securement relative to a rear sprocket cluster of a bicycle.

DESCRIPTION OF THE PREFERRED EMBODIMENT

Referring now to the drawings there is shown the cleaning device of the present invention and which is comprised of a scraper element 1 which is formed by a flat plastic plate having a plurality of narrow finger elements 11 formed integral therewith and extending from a free end thereof. The plate 1 has an opposite securement end 12 for attachment to a bracket 2. The fingers 11 are of a substantially rectangular configuration and are disposed in a space parallel manner whereby to project into the space 13 between the sprockets 14 of the sprocket cluster 10. As shown in FIG. 2 the sprocket cluster is comprised of concentricly disposed sprockets 14 of varying sizes. The fingers 11 are also offset longitudinally depending on the depth of the space 13 between the sprockets 14.

As more clearly shown in FIG. 2 the plastic plate 1 is secured at its securement end 12 to a plate attachment end 15 of the bracket 2. The securement is effected by the combination of the bolt 7, washers 8 and locknut 6. The bracket 2 is formed from an aluminum plate which defines a clamp end 16 which is secured to a clamp 3 suitable for attachment to a bicycle frame tube 9. A rubber bushing 4 is positioned about the tube 9 intermediate the tube and the clamp 3. The clamp 3 provides an adjustment means whereby to adjustably position the finger elements 11 of the scraper plate i into the spaces 13 between the sprockets 14. Once the fingers are in proper position the clamp is secured by means of the locking bolt 5 and the locknut 6.

As shown in FIG. 2 the plate securement end 15 of the bracket 12 is disposed at an angle to support the plastic scraper element 1 below the drive shaft 17 and at an upwardly extending angle such that the finger elements project against the rotation drive direction, as indicated by arrow 18, of the sprockets 14 to scrape foreign matter lodged between the sprockets. If the foreign matter is rigidly embedded between the sprockets it will cause the scraper plate 1 to bend downwardly with the bracket 2 applying an upward force against the plate to apply more pressure on the foreign matter element to dislodge same.

Although, as shown in FIG. 2, the sprocket cluster 10 is shown as secured to the drive shaft 17 of the rear wheel of a bicycle, it is also within the scope of the present invention to secure the cleaning device in a position to clean the front sprocket cluster of the bicycle where the pedals are secured to the drive shaft.

We claim:

1. A cleaning device for cleaning foreign matter from a space defined between opposed parallel surfaces of at least two spaced-apart adjacent sprockets secured to a bicycle wheel drive shaft, said device comprising a scraper element being disposed in said space defined between said adjacent sprockets and extending toward said wheel drive shaft for dislodging foreign matter lodged in said space, and attachment means to retain said scraper element at a predetermined position in a frontal part of said sprockets.

2. A cleaning device as claimed in claim 1 wherein said scraper element is a narrow finger element.

3. A cleaning device as claimed in claim 2 wherein said scraper element is a flat plate having a plurality of said narrow finger element formed integral therewith ant extending from a free end thereof, said plate having an opposite securement end, some of said finger elements extending in associated ones of said spaces between a plurality of said sprockets disposed concentrically in a cluster arrangement.

4. A cleaning device as claimed in claim 3 wherein said finger elements are elongated rectangular fingers, said finger elements being disposed parallel to one another and offset longitudinally.

5. A cleaning device as claimed in claim 3 wherein said attachment means is a bracket having a plate attachment end and a clamp end for attachment to a tubular frame member of a mountain-type bicycle.

6. A cleaning device as claimed in claim 5 wherein said plate securement end is disposed at an angle to support said flat plate below said drive shaft and at an upwardly extending angle such that said finger elements project against a rotational drive direction of said sprockets to scrape said foreign matter between said sprockets.

7. A cleaning device as claimed in claim 5 wherein said securement end of said plate is secured to said plate attachment end by a removable fastener, said clamp end having a clamp secured thereto to adjustably position said finger elements into said spaces between said sprockets and clamp same at desired position.

8. A cleaning device as claimed in claim 3 wherein said bicycle wheel drive shaft is a rear wheel support drive shaft.

* * * * *